United States Patent
Wolf et al.

(10) Patent No.: US 6,763,243 B2
(45) Date of Patent: Jul. 13, 2004

(54) METHOD AND APPARATUS FOR PROVIDING PRIORITIZED MULTI-PARTY COMMUNICATION SESSIONS IN A WIRELESS COMMUNICATION SYSTEM

(75) Inventors: Tracy L. Wolf, Elgin, IL (US); Paul M. Erickson, Palatine, IL (US); John C. Stanaway, Wheeling, IL (US); Peter M. Drozt, Praire Grove, IL (US); Steven E. VanSwol, Lombard, IL (US)

(73) Assignee: Motorola, Inc., Schaumburg, IL (US)

(*) Notice: Subject to any disclaimer, the term of this patent is extended or adjusted under 35 U.S.C. 154(b) by 18 days.

(21) Appl. No.: 10/187,696

(22) Filed: Jul. 2, 2002

(65) Prior Publication Data

US 2004/0005904 A1 Jan. 8, 2004

(51) Int. Cl.[7] .............................................. H04B 1/00
(52) U.S. Cl. ................................... 455/519; 455/452.1
(58) Field of Search ................................ 455/518, 519, 455/520, 521, 527, 452.1

(56) References Cited

U.S. PATENT DOCUMENTS

| | | | | |
|---|---|---|---|---|
| 5,634,197 A | * | 5/1997 | Paavonen | 455/512 |
| 5,752,196 A | * | 5/1998 | Ahvenainen et al. | 455/518 |
| 6,138,031 A | * | 10/2000 | Sillanpaa et al. | 455/512 |
| 6,208,872 B1 | * | 3/2001 | Schmidt | 455/518 |
| 6,516,200 B1 | * | 2/2003 | Schmidt et al. | 455/518 |

* cited by examiner

Primary Examiner—Nick Corsaro
(74) Attorney, Agent, or Firm—Steven A. May

(57) ABSTRACT

A wireless communication system that includes an MS that is a member of multiple talkgroups provides for a prioritization of the multiple talkgroups. A database included in the system maintains an MS identifier associated with the MS and maintains multiple talkgroup identifiers in association with the MS identifier, wherein each talkgroup identifier of the multiple talkgroup identifiers corresponds to a talkgroup of the multiple talkgroups. The database further maintains a prioritization associated with at least one talkgroup of the multiple talkgroups. In one embodiment of the invention, the MS may dynamically prioritize the multiple talkgroups to which it belongs. In another embodiment of the present invention, the prioritization may be statically maintained. In still another embodiment of the invention, the system utilizes the maintained prioritizations to determine whether to interrupt the MS when the MS is involved in a multi-party communication session.

26 Claims, 3 Drawing Sheets

METHOD AND APPARATUS FOR PROVIDING PRIORITIZED MULTI-PARTY COMMUNICATION SESSIONS IN A WIRELESS COMMUNICATION SYSTEM

FIELD OF THE INVENTION

The present invention relates generally to wireless communication systems, and, in particular, to group call services in wireless communication systems.

BACKGROUND OF THE INVENTION

When a new group call is initiated by a mobile station (MS), a Group Call Controller determines a corresponding talkgroup by reference to a database listing the talkgroup. The Group Call Controller then conveys a page to the talkgroup members, or MSs affiliated with the talkgroup, which page includes a talkgroup identifier associated with the talkgroup. When an MS is not otherwise engaged in an active communication, the MS responds to the page and is coupled by the Group Call Controller to the talkgroup call. However, when an MS is actively engaged in another group call at the time that the MS is paged, then the MS does not respond to the page. The Group Call Controller does not try to individually contact the MS that is actively engaged in another group call. As a result, an MS that is actively engaged in another group call is not coupled to the new group call.

Situations exist where it may be desirable to interrupt an MS participating in an on-going group call in order to couple the MS to a new group call involving a first talkgroup and to not interrupt the user in the event of a group call involving a second, different talkgroup. For example, a user may be a member of a first talkgroup, such as a business talkgroup, and a second talkgroup, such as a social talkgroup. Such a user may desire to be interrupted by, and to participate in, a group call involving the business talkgroup if the user is participating in a group call involving the social talkgroup. On the other hand, the user may desire to not be interrupted if the user is participating in a group call involving the business talk group and a group call involving the social talkgroup is initiated. In the prior art, a user participating in a group call is not alerted to the existence of a new group call while the user continues to participate in an earlier group call. In addition, in the prior art the user cannot select the group calls for which he or she shall be interrupted and shall not be interrupted.

Therefore, a need exists for a method and apparatus for interrupting a participant in a group call when a new group call is initiated and for allowing the participant to select the group calls for which he or she shall be interrupted and the group calls for which he or she shall not be interrupted.

DETAILED DESCRIPTION OF THE INVENTION

Figures 1, 2:
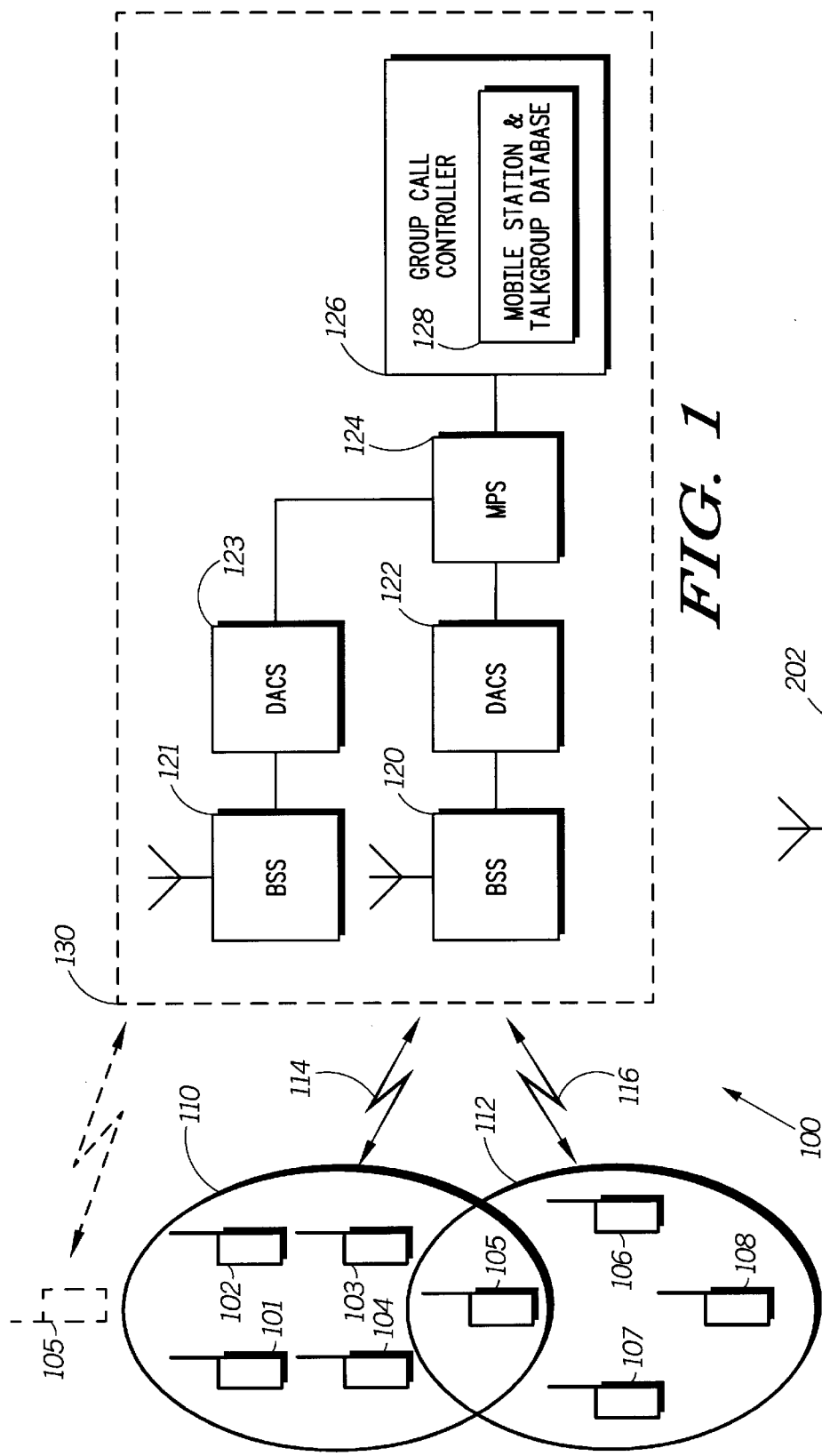
FIG. 1 is a block diagram of a wireless communication system in accordance with an embodiment of the present invention.
FIG. 2 is a block diagram of a mobile station of FIG. 1 in accordance with an embodiment of the present invention.

To address the need for a method and an apparatus for interrupting a participant in a group call when a new group call is initiated and for allowing the participant to select the group calls for which he or she shall be interrupted and the group calls for which he or she shall not be interrupted, a wireless communication system is provided that includes an MS that is a member of multiple talkgroups and provides for a prioritization of the multiple talkgroups. A database included in the system maintains an MS identifier associated with the MS and maintains multiple talkgroup identifiers in association with the MS identifier, wherein each talkgroup identifier of the multiple talkgroup identifiers corresponds to a talkgroup of the multiple talkgroups. The database further maintains a prioritization associated with at least one talkgroup of the multiple talkgroups. In one embodiment of the present invention, the MS may dynamically prioritize the multiple talkgroups to which is belongs. In another embodiment of the present invention, the prioritization may be statically maintained. In still another embodiment of the present invention, the system utilizes the maintained prioritizations to determine whether to interrupt the MS when the MS is involved in a multi-party communication session.

Generally, an embodiment of the present invention encompasses a method for prioritizing talkgroups in a wireless communication system that comprises multiple talkgroups. The method includes steps of maintaining a mobile station (MS) identifier, wherein an MS corresponding to the MS identifier is a member of each talkgroup of the multiple talkgroups, maintaining multiple talkgroup identifiers in association with the MS identifier, wherein each talkgroup identifier of the multiple talkgroup identifiers corresponds to a talkgroup of the multiple talkgroups, and maintaining a prioritization of at least one talkgroup of the multiple talkgroups.

Another embodiment of the present invention encompasses a method for establishing a prioritized multi-party communication session in a wireless communication system. The method includes steps of receiving a request to establish a second multi-party communication session involving a second talkgroup and determining whether an MS affiliated with the second talkgroup is engaged in a first multi-party communication session associated with a first talkgroup. The method further includes steps of determining a priority of the first talkgroup relative to a priority of the second talkgroup; and, based on the determined priority of the first talkgroup relative to the priority of the second talkgroup, determining whether to interrupt the participation of the MS in the first multi-party communication session.

Yet another embodiment of the present invention encompasses a method for dynamically prioritizing talkgroups by an MS that is a member of each talkgroup of multiple talkgroups. The method includes steps of storing an MS identifier, wherein the MS identifier is uniquely associated with the MS, and storing multiple talkgroup identifiers in association with the MS identifier, wherein each talkgroup identifier of the multiple talkgroup identifiers corresponds to a talkgroup of the multiple talkgroups. The method further includes steps of prompting a user of the MS to prioritize at least one talkgroup of the multiple talkgroups and, in response to the prompt, receiving a prioritization of the at least one talkgroup of the multiple talkgroups.

Still another embodiment of the present invention encompasses an apparatus for prioritizing talkgroups in a wireless communication system that includes multiple talkgroups.

The apparatus includes a database that stores a talkgroup identifier corresponding to each talkgroup of the multiple talkgroups and, in association with each talkgroup of the multiple talkgroups, stores an identifier associated with at least one member of the talkgroup and a priority of the talkgroup. The apparatus further includes a group call controller that determines a priority of a talkgroup of the multiple talkgroups relative to a different talkgroup of the multiple talkgroups by reference to the database.

The present invention may be more fully described with reference to FIGS. 1–4. FIG. 1 is a block diagram of a wireless communication system 100 in accordance with an embodiment of the present invention. Communication system 100 includes multiple Base Station Subsystems (BSSs) 120, 121 (two shown) that are each operably coupled to a respective Digital Access Crossconnect Switch (DACS) 122, 123. Each DACS 122, 123 is in turn coupled to a Metro Packet Switch (MPS) 124, and the MPS is in turn operably coupled to a Group Call Controller 126. Preferably, each BSS of the multiple BSSs 120, 121 is an Enhanced Base Transceiver System (EBTS) and Group Call Controller 126 is a Dispatch Application Processor (DAP) that has been modified to perform functions in accordance with the present invention. EBTSs and DAPs are each available from Motorola, Inc., of Schaumburg, Ill. DACSs 122 and 123 and MPS 124 are also available from Motorola. BSSs 120 and 121, DACSs 122 and 123, MPS 124, and DAP 126 are collectively referred to herein as a fixed infrastructure 130 of communication system 100.

Communication system 100 further comprises multiple mobile stations (MSs) 101–108 (eight shown). Each MS of the multiple MSs 101–108 is in wireless communication with a BSS of the multiple BSSs 120, 121, such as BSS 120, which BSS provides wireless communication services to the MS. In addition, each MS of the multiple MSs 101–108 belongs to at least one talkgroup of multiple talkgroups 110, 112 (two shown) included in system 100. As depicted in FIG. 1, each of MSs 101–105 is a member of talkgroup 110, and each of MSs 105–108 is a member of talkgroup 112.

FIG. 2 is a block diagram of a mobile station, such as MSs 101–108, in accordance with an embodiment of the present invention. Each MS of the multiple MSs 101–108 includes a user display (not shown), a processor 202, such as one or more microprocessors, microcontrollers, digital signal processors (DSPs), combinations thereof or such other devices known to those having ordinary skill in the art, and one or more associated memory devices 204, such as random access memory (RAM), dynamic random access memory (DRAM), and/or read only memory (ROM) or equivalents thereof, that store data and programs that may be executed by the processor. Memory device 204 further stores an MS identifier that is uniquely associated with the MS and talkgroup identifiers that correspond to each of the talkgroups of which the MS is a member.

MPS 124 includes a packet switch and routes control information between Group Call Controller 126 and BSS 120. Group Call Controller 126 maintains and tracks provisioning and mobility information with respect to group calls for each MS 101–108 in communication system 100, including registration of the MS when the MS activates in communication system 100 and control of group calls. Group Call Controller 126 includes, or is operably coupled to, a mobile station and talkgroup database 128 that stores, in association with each talkgroup 110, 112 (two shown) included in communication system 100, a talkgroup identifier uniquely associated with the talkgroup and a list of MS identifiers, wherein each MS identifier in the list of MS identifiers corresponds to an MS that is a member of the talkgroup. In addition, database 128 stores, in association with each MS 101–108 included in communication system 100, an MS identifier associated with the MS, dispatch services subscribed to by the MS, and a list of talkgroups, preferably the talkgroup identifier associated with each talkgroup, of which the MS is a member. Database 128 may be included in a Home Location Register (HLR) or a Visited Location Register (VLR) as known in the art, or a combination of a HLR and a VLR, or a combination of one or more HLRs and/or VLRs, which HLRs and/or VLRs are modified to perform the functions of the present invention. In another embodiment of the present invention, the functions performed herein by Group Call Controller 126 may be distributed among the Group Call Controller and the Register, such as an HLR or a VLR, that includes database 128.

Preferably, communication system 100 comprises a wireless dispatch communication system. In order for an initiating MS, such as MS 101, to establish a group call with other MSs that are members of a talkgroup that includes the initiating MS, each element 101–108, 122, 124, 124, and 126 of communication system 100 operates in accordance with well-known wireless dispatch communication protocols. By operating in accordance with well-known protocols, a user of MS 101 can be assured that MS 101 will be able to communicate with infrastructure 130 and establish a dispatch communication with other members of a talkgroup that includes MS 101. Preferably, communication system 100 operates in accordance with the iDEN® standard, which standard specifies wireless telecommunications system operating protocols, including radio system parameters and call processing procedures. In addition, preferably communication system 100 is a Time Division Multiple Access (TDMA) communication system in which communication channels, such as traffic channels and control channels, comprise time slots in a frequency bandwidth. However, those who are of ordinary skill in the art realize that communication system 100 may operate in accordance with any wireless telecommunication system that includes group calls, such as but not limited to a Code Division Multiple Access (CDMA) communication system, a Global System for Mobile communication (GSM) communication system, other Time Division Multiple Access (TDMA) communication systems, a Frequency Division Multiple Access (FDMA) communication system, or an Orthogonal Frequency Division Multiple Access (OFDM) communication system.

In the prior art, when a group call is initiated by an MS, a Group Call Controller determines a talkgroup associated with the group call by reference to a VLR or an HLR. The Group Call Controller then conveys a page to the talkgroup members, that is, the MSs affiliated with the talkgroup. The page includes a talkgroup identifier associated with the talkgroup. When an MS is not otherwise engaged in an active communication, the MS responds to the page and is coupled to the talkgroup call. When the MS is engaged in an active communication at the time the MS is paged, the user of the MS does not respond to the page and is not coupled to the call. However, a user of an MS may desire to be interrupted when a higher priority group call is initiated while the user is participating in lower priority group call, or to not be interrupted when the user of the MS is participating in higher priority call and a lower priority call is initiated. In order to allow an MS, such as MSs 101–108, to be alerted to a higher priority group call when engaged in a lower priority group call and to not be alerted to a lower priority group call when engaged in a higher priority group call, communication system 100 provides a method and apparatus for prioritizing talkgroups and interrupting a group call based on talkgroup prioritization.

Figure 3:
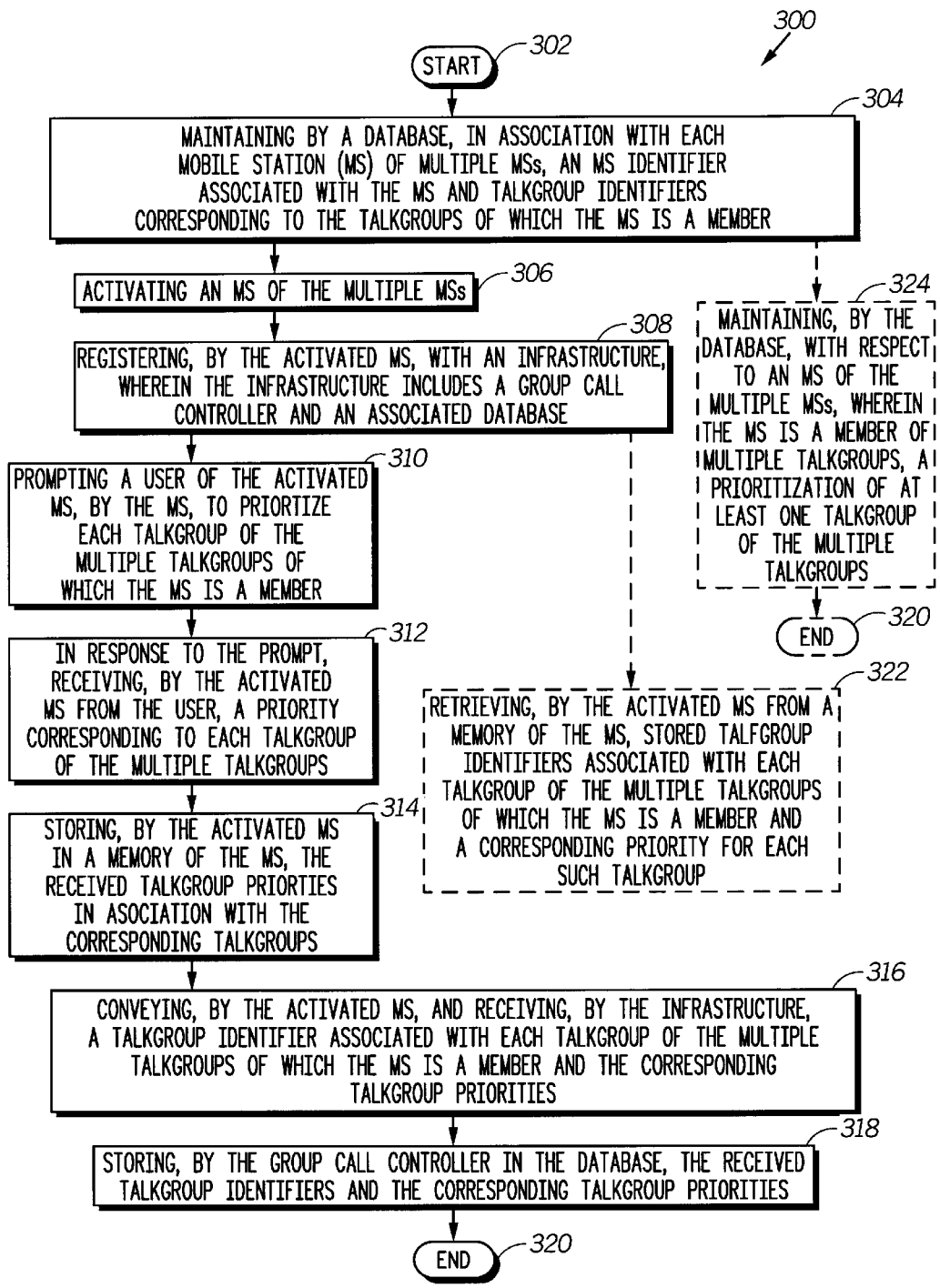
FIG. 3 is a logic flow diagram of steps executed by the communication system of FIG. 1 in providing a prioritization of each of multiple talkgroups associated with a mobile station of FIG. 1 in accordance with an embodiment of the present invention.

In one embodiment of the present invention, a dynamic prioritization embodiment, a user of an MS, such as MS 105, that is a member of multiple talkgroups, such as talkgroups 110 and 112, can prioritize the multiple talkgroups to which the MS belongs each time the MS registers with the communication system. FIG. 3 is a logic flow diagram 300 of steps executed by communication system 100 in order to provide a dynamic process of prioritization of each of multiple talkgroups associated with an MS, such as MS 105, in accordance with an embodiment of the present invention.

Logic flow diagram 300 begins (302) with communication system 100 maintaining (302), in database 128, an MS identifier associated with each MS of the multiple MSs 101–108 and, in association with each MS identifier, a list of all talkgroups to which the corresponding MS belongs. Database 128 preferably further maintains, in association with each MS active in communication system 100, such as MSs 101–104 and 106–108, and the talkgroups to which the MS belongs, a temporary MS identifier assigned by Group Call Controller 126 to the MS. Upon assigning the temporary MS identifier to MS 105, Group Call Controller further stores the temporary MS identifier in database 128 in association with the talkgroup identifiers corresponding to the talkgroups 110, 112 of which MS 105 is a member. MS 105, in particular memory device 204 of the MS, also maintains an MS identifier associated with the MS and a corresponding list of talkgroup identifiers associated with the talkgroups 110, 112 to which the MS belongs.

When a user of an MS that is a member of multiple talkgroups, such as MS 105, activates (306) the MS, the MS registers (308) with infrastructure 130 in accordance with well-known registration techniques. Preferably, the step of registering includes the following steps. MS 105 conveys the MS identifier stored in memory device 204 of the MS to infrastructure 130. Infrastructure 130 routes the received MS identifier to Group Call Controller 126. Based upon the received MS identifier, Group Call Controller 126 retrieves, from database 128, the services subscribed to by MS 105 and multiple talkgroups 110, 112, preferably the talkgroup identifiers corresponding to the talkgroups, associated with MS 105. Group Call Controller 126 also assigns to MS 105, and stores in database 128 in association with MS 105, a temporary MS identifier that is used to identify MS 105 while the MS is active in communication system 100.

Group Call Controller 126 conveys the retrieved talkgroup identifiers and assigned temporary MS identifier to MS 105. MS 105 stores the received temporary MS identifier, preferably in memory device 204 of the MS, and synchronizes the received talkgroup identifiers with the list of talkgroup identifiers stored in the MS. MS 105 then prompts (310) a user of the MS to prioritize the talkgroups 110, 112 of which the MS is a member, preferably by displaying a list of talkgroups associated with the MS. In response to the prompt, the user assigns, preferably via a keypad included in the MS or alternatively via audio instructions, and MS 105 receives (312), a priority corresponding to each talkgroup. For example, in a dual priority system, the user of MS 105 may assign a 'high' priority or a 'low' priority to each talkgroup. However, those who are of ordinary skill in the art realize that the number of priority levels is up to the designer of the communication system, and that more than two priority levels may be used herein without departing from the spirit and scope of the present invention.

MS 105 then conveys (316) the talkgroup identifiers and corresponding assigned priorities to infrastructure 130, where Group Call Controller 126 stores (318) the received talkgroup identifiers and corresponding priorities in database 128. MS 105 may also store (314), in association with the corresponding talk groups and in memory device 204 of the MS, the assigned priorities input by the user of the MS. Logic flow 300 then ends (320). Based on the priorities assigned by the user of the MS to the talkgroups associated with the MS, when a communication session corresponding to higher priority talkgroup is initiated, communication system 100 may interrupt a participation of the MS in a communication session corresponding to lower priority, or alternatively same priority or lower priority, talkgroup.

In another embodiment of the present invention, the user's prioritization of the talk groups to which the user belongs may be stored in the user's MS and conveyed to infrastructure upon activation of the MS without user intervention. For example, when the user first activates the MS in system 100, the MS may prompt the user to prioritize the talkgroups as described above in step 310, in response to which the user inputs the talkgroup priorities as described above in step 312 and the MS stores the input priorities as described above in step 314. When the user subsequently reactivates the MS in system 100 and registers with system 100, as described above in steps 304 and 306, the MS retrieves (322), from memory device 204 of the MS, the stored talkgroup identifiers associated with the talkgroups to which the MS belongs and the corresponding talkgroup priorities and conveys, as described above in step 316, the retrieved talkgroup identifiers and the corresponding talkgroup priorities to infrastructure 130.

In yet another embodiment of the present invention, a static prioritization embodiment, talkgroups associated with an MS, such as talkgroups 110 and 112 with respect to MS 105, may be prioritized, that is, assigned a priority, when a user of the MS subscribes to the services of communication system 100. Each talkgroup is assigned a priority at the time that the MS is added to communication system 100. Each assigned priority is then stored, for example by a system operator, and subsequently maintained (324), in database 128 in association with the MS and the corresponding talkgroup.

In still another embodiment of the present invention, the storing of talk group identifiers and corresponding talk group priorities may include a step of marking, preferably by Group Call Controller 126 in the dynamic embodiment or by the system operator in the static embodiment, at least one talkgroup of which MS 105 is a member and which MS 105 has prioritized. The step of marking of a talkgroup preferably comprises steps of storing, in database 128 and with respect to the talkgroup, such as talkgroup 110 or 112, and subsequently maintaining by the database, information indicating that MS 105 may be interrupted in order to participate in a second multi-party communication session involving a second talkgroup when the MS is participating in a first multi-party communication session involving first talkgroup that is a lower priority, or a same or a lower priority, than the second talkgroup. A talkgroup may be marked upon conveyance by the MS of the talkgroup priorities or upon the initial participation by the MS in a multi-party communication session involving the lower priority talkgroup. In the latter instance, the Group Call Controller may remove, or cancel, the mark upon termination of the communication session involving the lower priority talk group.

In one embodiment of the present invention, Group Call Controller 126 or the system operator may mark a higher priority talkgroup, such as talkgroup 110, by adding MS 105, that is, an MS identifier corresponding to MS 105, to a priority list that is stored in database 128 and associated with the talkgroup. The priority list is a list of MS identifiers corresponding to each MS, such as MS 105, that has assigned the talkgroup, that is, talkgroup 110, a higher priority, or alternatively a same or a higher priority, than a different talkgroup, such as talkgroup 112, of the multiple talkgroups to which the MS belongs. When a group call is initiated for higher priority talkgroup 110, Group Call Controller 126 can determine, by reference to database 128 and the priority list associated with higher priority talkgroup 110, to interrupt MS 105 if MS 105 is engaged in a communication session involving a lower priority talkgroup, that is, talkgroup 112.

In another embodiment of the present invention, Group Call Controller 126 or the system operator may mark a lower priority talkgroup, such as talkgroup 112, by storing information, in database 128 and with respect to lower priority talkgroup 112, indicating the talkgroups, such as talkgroup 110, to which MS 105 has assigned a higher priority, or alternatively a same priority or a higher priority, than talkgroup 112. When communication system 100 sets up a multi-party communication session involving the lower priority talkgroup, that is, talkgroup 112, Group Call Controller 126 references the marking information stored in database 128 with respect to lower priority talkgroup 112 and marks each talkgroup of which MS 105 is a member and which talkgroup (i.e., talkgroup 110) has been assigned a higher priority, or a same or a higher priority than lower priority talkgroup 112. That is, when a multi-party communication session is set up for lower priority talkgroup 112, Group Call Controller 126 stores, in database 128, information in association with higher priority talkgroup 110 that indicates that MS 105 may be interrupted if communication system 100 sets up a multi-party communication session for talkgroup 110. When a multiparty communication session involving talkgroup 110 is set up while MS 105 is still active in a multi-party communication session involving lower priority talkgroup 112, Group Call Controller 126 is able to determine to interrupt the MS by reference to database 128 and the marking information that was stored in association with talkgroup 110 when the multi-party communication session involving talk group 112 was set up. Upon termination of the communication session involving the lower priority talkgroup, the marks may be removed, or cancelled, from the higher priority talk groups by Group Call Controller 126.

In general, in order to determine whether or not to interrupt an MS, such as MS 105, when the MS is participating in a multi-party communication session and a different multi-party communication session is initiated, communication system 100 maintains, in database 128, talkgroup identifiers corresponding to each of the multiple talkgroups 110, 112 to which MS 105 belongs and further maintains prioritizations associated with each talkgroup of the multiple talkgroups 110, 112. In one embodiment of the present invention, MS 105 may dynamically prioritize the multiple talkgroups to which it belongs by assigning priorities to each talkgroup each time the MS registers with communication system 100. In another embodiment of the present invention, the prioritization may be statically maintained in database 128. In yet another embodiment of the present invention, the maintaining of talkgroup prioritizations may include marking a second talkgroup to indicate that the MS may be interrupted when engaged in a multi-party communication session involving a first talkgroup, wherein the second talkgroup is a higher priority, or a same or a higher priority, talkgroup than the first talkgroup. In still another embodiment of the present invention, the maintaining of talk group prioritizations may include marking a first talkgroup with information associating the talkgroup with a second talkgroup, wherein the second talkgroup is a higher priority, or a same or a higher priority, than the first talkgroup. When a multi-party communication session is subsequently initiated in regard to the first talkgroup, communication system 100 marks the associated second talkgroup based on the marking of the first talkgroup, thereby facilitating a determination by Group Call Controller 126 to interrupt the multi-party communication session involving the first talkgroup when a multi-party communication session involving the second talkgroup is initiated.

Figure 4:
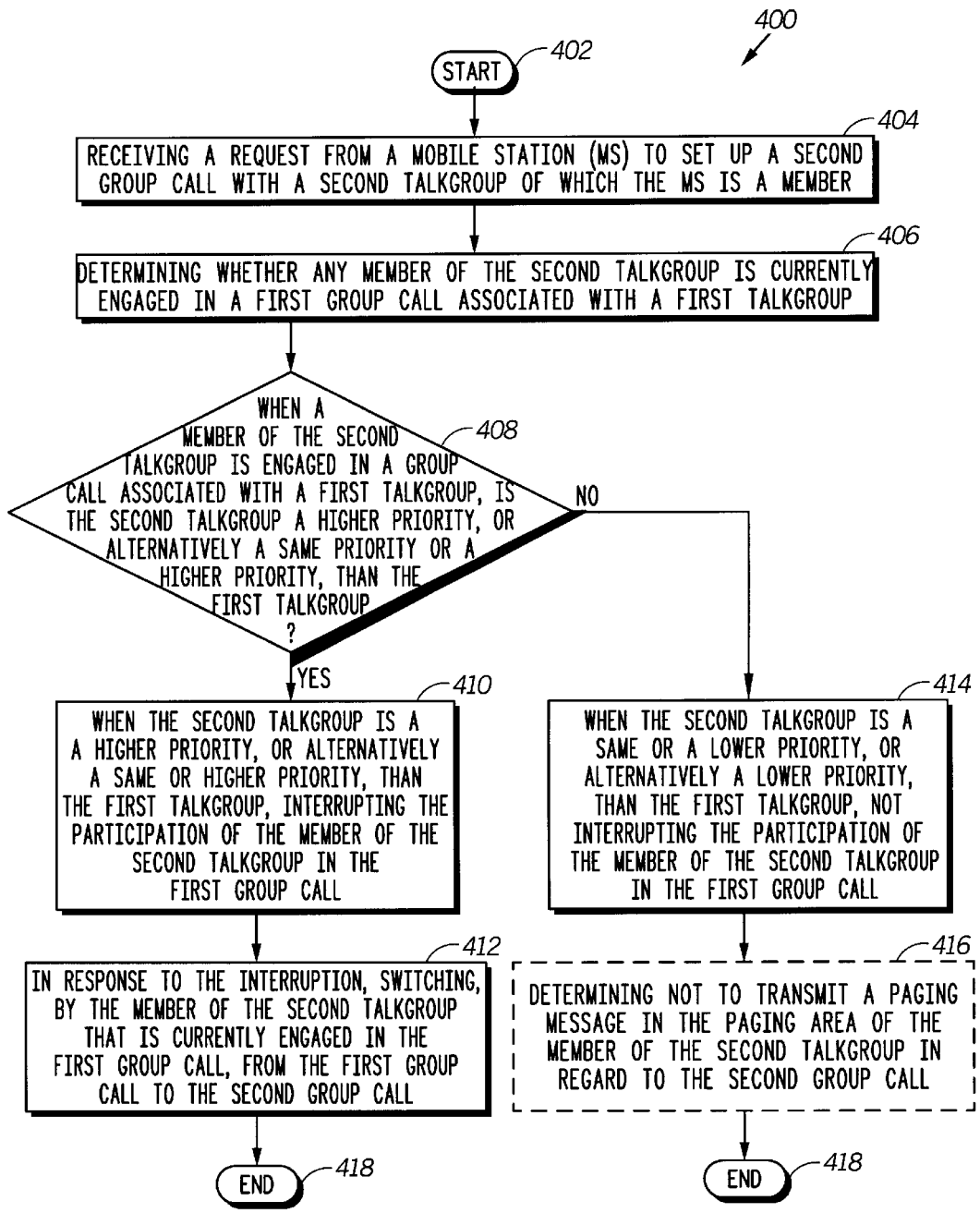
FIG. 4 is a logic flow diagram of steps executed by the communication system of FIG. 1 in establishing a prioritized group call in accordance with an embodiment of the present invention.

FIG. 4 is a logic flow diagram 400 of steps executed by communication system 100 in order to establish a prioritized multi-party communication session, such as a group call, involving multiple participants in accordance with an embodiment of the present invention. Logic flow diagram 400 begins (402) when infrastructure 130, and in particular BSS 120 receives (404) a request from an MS, such as MS 108, to set up a second multi-party communication session, preferably a group call, with respect to a second talkgroup 10 of which the MS is a member, while another MS that is a member of talkgroup 110, that is, MS 105, is participating in a first multi-party communication session, preferably also a group call, involving a first talkgroup, that is, talkgroup 112. Preferably the request includes a talkgroup identifier associated with the second talkgroup. The request is routed by infrastructure 130 to Group Call Controller 126.

In response to receiving the request, Group Call Controller 126 determines (406), by reference to database 128, whether any member of second talkgroup 110, such as MS 105, is currently engaged in a first multi-party communication session associated with a first talkgroup, that is, talkgroup 112. When MS 105 is currently engaged in a first multi-party communication session with respect to first talkgroup 112, Group Call Controller 126 further determines (408) whether the second talkgroup 110 is a higher priority talkgroup, or alternatively is a talkgroup of a same priority or a higher priority, than first talkgroup 112.

When the second multi-party communication session involves a talk group 110 that is a higher priority, or alternatively a same priority or a higher priority, talkgroup than the talkgroup 112 involved in the first multi-party communication session, Group Call Controller 126 interrupts (410) a participation of MS 105 in the first multi-party communication session associated with first talkgroup 112 so that MS 105 may participate in the second multi-party communication session associated second talkgroup 110. Preferably, Group Call Controller 126 interrupts MS 105's participation in the first multi-party communication session by conveying a control message, preferably a talkgroup priority message, to the MS, via MPS 124, DACS 122, and BSS 120, informing the MS that the MS has a higher priority call, or alternatively a same priority or a higher priority call, elsewhere. The talkgroup priority message is conveyed over a control channel to MS 105, which control channel preferably is an associated control channel that is associated with, and included in, a first traffic channel 116 assigned by infrastructure 130 to the first multi-party communication session involving first talkgroup 112. Preferably, the talkgroup priority message includes an MS identifier associated with MS 105, preferably the MS's temporary MS identifier, or a talkgroup identifier associated with the second talkgroup 110, and informs of a second traffic channel 114 assigned by infrastructure 130 to the second talkgroup 110. Upon receiving the message and determining that the message is intended for itself, MS 105 switches (412) to the second multi-party communication session associated with the second, higher priority, or alternatively higher or same priority, talkgroup 110, preferably by tuning to the second traffic channel 114, and the logic flow ends (418).

In one embodiment of the present invention, the step of switching (412) includes MS 105 automatically switching to the second traffic channel in response to receipt of the talkgroup changeover message without an intervention of a user of MS 105. In another embodiment of the present invention, the step of switching (412) may include the following steps. Upon receiving the message and determining that the message is intended for itself, MS 105 notifies the user of the MS, via an audio announcement or a visual announcement, of the existence of the second multi-party communication session. In response to receiving the announcement, the user may ignore the announcement if the user desires to continue participating in the first multi-party communication session. If the user desires to switch to the second multi-party communication session, the user may cause MS 105 to switch to the second traffic channel 114 by inputting a request to switch to the second multi-party communication session, for example by depressing a key on a keypad of the MS or by touching a softkey on the user display of the MS. In response to receiving the user's request to switch, MS 105 tunes to the second traffic channel 114.

When MS 105 is currently engaged in a multi-party communication session with respect to a higher priority, or alternatively a same priority or a higher priority, talkgroup, for example if first talkgroup 112 involved in the first communication session is a higher priority, or a same priority or a higher priority, talkgroup than the second talkgroup 110 involved in the second communication session, Group Call Controller 126 may determine not to interrupt (414) a participation of MS 105 in the first communication session associated with the first talkgroup 112. In addition, when MS 105 is in a different paging area from the other MS's of the second talkgroup 110, for example is serviced by a BSS 121 and DACS 123 that is different than the BSS 120 and DACS 122 serving the other members of talkgroup 112 (indicated by the dashed MS 105 in FIG. 1), Group Call Controller 126 may determine (416) to not even transmit a paging message in the paging area of MS 105 in regard to the second communication session.

In general, communication system 100 utilizes talkgroup prioritizations to determine whether to interrupt a mobile station, such as MS 105, when the MS is engaged in a multi-party communication session involving a first talkgroup and a new multi-party communication session is initiated involving a second talkgroup. The talkgroup prioritizations are maintained in database 128 in association with the talkgroups to which the MS belongs. When MS 105 is engaged in a first multi-party communication session involving a first talkgroup and a second multi-party communication session involving a second talkgroup is initiated, wherein the second talkgroup is a higher priority talkgroup, or a same or a higher priority talkgroup, than the first talkgroup, system 100 alerts MS 105 to the existence of the second multi-party communication session in order to allow the MS to switch to the second multi-party communication session. When MS 105 is engaged in a first multi-party communication session involving a first talkgroup and a second multi-party communication session involving a second talkgroup is initiated, wherein the second talkgroup is a lower priority talkgroup, or a same or a lower priority talkgroup, than the first talkgroup, system 100 may determine not to interrupt the MS's participation in the first multi-party communication session and may determine to not even page the MS in regard to the second multi-party communication session.

While the present invention has been particularly shown and described with reference to particular embodiments thereof, it will be understood by those skilled in the art that various changes may be made and equivalents substituted for elements thereof without departing from the scope of the invention as set forth in the claims below. Accordingly, the specification and figures are to be regarded in an illustrative rather then a restrictive sense, and all such changes and substitutions are intended to be included within the scope of the present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for prioritizing talkgroups in a wireless communication system that comprises a plurality of talkgroups, the method comprising steps of:

maintaining, for each mobile station of a plurality of mobile stations, a mobile station identifier, wherein a mobile station corresponding to the mobile station identifier is a member of each talkgroup of the plurality of talkgroups;

maintaining, in association with each mobile station identifier, a plurality of talkgroup identifiers wherein each talkgroup identifier of the plurality of talkgroup identifiers corresponds to a talkgroup of the plurality of talkgroups;

maintaining, in association with each mobile station identifier, a prioritization of at least one talkgroup identifier of the plurality of talkgroups identifiers associated with the mobile station identifier; and when a talkgroup call becomes active, determining which one or more mobile stations of the plurality of mobile stations to interrupt based on the prioritization, associated with each mobile station identifier, of at least one talkgroup identifier.

2. The method of claim 1, wherein the step of maintaining a prioritization of at least one talk group of the plurality of talk groups comprises steps of receiving, from the mobile station, a prioritization of at least one talkgroup of the plurality of talkgroups; and storing the received prioritization of at least one talkgroup in association with the at least one talkgroup.

3. The method of claim 1, wherein the step of maintaining the prioritization comprises a step of maintaining the mobile station identifier in a priority list associated with the at least one talkgroup.

4. The method of claim 1, wherein the step of maintaining a prioritization of at least one talkgroup of the plurality of talkgroups comprises a step of marking a second talkgroup of the plurality of talkgroups with information that indicates that the mobile station may be interrupted to participate in a second communication session involving the second talkgroup when the mobile station is engaged in a first communication session involving a first talkgroup of the plurality of talkgroups.

5. The method of claim 4, wherein the second talkgroup is marked in response to the mobile station engaging in a communication session involving the first talkgroup.

6. The method of claim 4, wherein the step of marking further comprises a step of canceling the marking of the second talkgroup in response to the mobile station terminating the mobile station's participation in the communication session involving the first talkgroup.

7. The method of claim 1, wherein the step of maintaining a prioritization of at least one talkgroup of the plurality of talkgroups comprises a step marking a first talkgroup of the plurality of talkgroups by storing a talkgroup identifier associated with a second talkgroup of the plurality of talkgroups in association with a talkgroup identifier associated with the first talkgroup.

8. The method of claim 7, wherein the step of marking further comprises a step of marking the second talkgroup in response to the mobile station engaging in a communication session involving the first talkgroup.

9. The method of claim 7, wherein the step of marking further comprises a step canceling the marking of the second talkgroup in response to the mobile station terminating the mobile station's participation in the communication session involving the first talkgroup.

10. A method for establishing a prioritized multi-party communication session in a wireless communication system comprising steps of:
    receiving a request to establish a multi-party communication session involving a talkgroup;
    determining, with respect to each mobile station (MS) of a plurality of mobile stations (MSs) affiliated with the second talkgroup, whether the MS is engaged in a multi-party communication session associated with a talkgroup other than the requested talkgroup;
    determining, for each MS engaged in multi-party communication session associated with a talkgroup other than the requested talkgroup, a priority of the requested talkgroup relative to a priority of the talkgroup other than the requested talkgroup, wherein the priorities are based on talkgroup prioritizations maintained for the MS; and
    determining, for each MS engaged in a multi-party communication session associated with a talkgroup other than the requested talkgroup and based on the talkgroup priority determined with respect to the MS, whether to interrupt the participation of the MS in the fleet multi-party communication session associated with the talkgroup other than the requested talkgroup.

11. The method of claim 10, further comprising a step of, upon determining to interrupt the participation of the MS in the first multi-party communication session, interrupting the participation of the MS in the first multi-party communication session.

12. The method of claim 11, wherein the step of interrupting comprises a step of conveying, to the mobile station, a message informing of the second multi-party communication session.

13. The method of claim 12, wherein the step of interrupting further comprises steps of:
    receiving, by the mobile station (MS), the message; and
    in response to receiving the message, switching, by the MS, to the second multi-party communication session.

14. The method of claim 12, wherein the step of interrupting comprises a step of conveying, to the mobile station over a traffic channel assigned to the first multi-party communication session, a message informing of the second multi-party communication session.

15. The method of claim 14, wherein traffic channel assigned to the first multi-party communication session comprises a first traffic channel, and wherein the step of interrupting further comprises steps of:
    receiving, byte mobile station (MS), the message; and
    in response to receiving the message, tuning, by the MS, to a second traffic channel assigned to the second multi-party communication session.

16. The method of claim 10, further comprising a step of, upon determining to not interrupt the participation of the mobile station (MS) in the first multi-party communication session, determining to not transmit a page concerning the second multi-party communication session in a paging area associated with the MS.

17. A method for dynamically prioritizing talkgroups by a mobile station that is a member of each talkgroup of a plurality of talkgroups, the method comprising steps of:
    storing a mobile station identifier, wherein the mobile station identifier is uniquely associated with the mobile station;
    storing a plurality of talkgroup identifiers in association with the mobile station identifier, wherein each talkgroup identifier of the plurality of talkgroup identifiers corresponds to a talkgroup of the plurality of talkgroups;
    prompting a user of the mobile station to prioritize at least one talkgroup of the plurality of talkgroups;
    in response to the prompt, receiving a prioritization of a talkgroup of the plurality of talkgroups relative to another talkgroup of the plurality of talkgroups, wherein a communication session involving the prioritized talkgroup may interrupt a communication session involving the another talkgroup; and
    storing the received prioritization in association with the mobile station.

18. The method of claim 17, further comprising a step of storing the received prioritization of at least one talkgroup in association with the at least one talkgroup.

19. The method of claim 17, wherein a wireless communication system includes an infrastructure in wireless communication with the mobile station and wherein the method further comprises a step of conveying the prioritization of the at least one talkgroup to the infrastructure.

20. An apparatus for prioritizing talkgroups in a wireless communication system that comprises a plurality of talkgroups, the apparatus comprising;
    a database that stores a talkgroup identifier corresponding to each talkgroup of the plurality of talkgroups and, in association with each talkgroup of the plurality of talkgroups, stores an identifier associated with at least one member of the talkgroup and a priority of the talkgroup with respect to each of the at least one member; and
    a group call controller that determines for each of the at least one member, in response to a request to establish a communication session involving a talkgroup of the plurality of talkgroups, and when the at least one member is engaged in a communication session involving a different talkgroup of the plurality of talkgroups other than the requested talkgroup, a priority of the former talkgroup relative to the latter talkgroup of the plurality of talkgroups by reference to the database.

21. The apparatus of claim 20, wherein the group call controller comprises the database.

22. The apparatus of claim 20, wherein the group call controller further receives a request to establish a first multi-party communication session involving a first talkgroup of the plurality of talkgroups, determines, by reference to the database, a mobile station (MS) affiliated with the first talkgroup, determines whether the MS is engaged in a second multi-party communication session associated with a second talkgroup of the plurality of talkgroups, determines, by reference to the database, whether the first talkgroup is a higher priority talkgroup than the second talkgroup, and, when the first talkgroup is a higher priority talkgroup than the second talkgroup, interrupts the participation of the MS in the second multi-party communication session.

23. The apparatus of claim 20, wherein the group call controller interrupts the participation of the mobile station (MS) in the multi-party second communication session by conveying, to the MS, a message informing of the first multi-party communication session.

24. The apparatus of claim 20, wherein the group call controller further receives a prioritization of each of a first talkgroup of the plurality of talkgroups and a second talkgroup of the plurality of talkgroups and stares, in the database, information in association with the first talkgroup that indicates that the mobile station may be interrupted to participate in a first multi-party communication session involving the first talkgroup when the mobile station is engaged in a second multi-party communication session involving the second talkgroup.

25. The apparatus of claim 20, wherein the database stores the priority of the talkgroup by storing the talkgroup identifier in a priority list associated with a different talkgroup of the plurality of talkgroups.

26. The apparatus of claim 20, wherein the group call controller further receives a prioritization of each of a first talkgroup of the plurality of talkgroups and a second talkgroup of the plurality of talkgroups and stores, in the database, a talkgroup identifier associated with the first talkgroup in association with a talkgroup identifier associated with the second talkgroup.

\* \* \* \* \*